US009833045B2

(12) United States Patent
Mangold et al.

(10) Patent No.: US 9,833,045 B2
(45) Date of Patent: Dec. 5, 2017

(54) BELT BUCKLE WITH BELT BUCKLE HOUSING

(71) Applicant: TAKATA AG, Aschaffenburg (DE)

(72) Inventors: Rainer Mangold, Merklingen (DE); Gerhard Frey, Steinheim (DE); Thomas Grasser, Illerrieden (DE)

(73) Assignee: TAKATA AG, Aschaffenburg (DE)

( * ) Notice: Subject to any disclaimer, the term of this patent is extended or adjusted under 35 U.S.C. 154(b) by 0 days.

(21) Appl. No.: 15/023,999

(22) PCT Filed: Sep. 9, 2014

(86) PCT No.: PCT/DE2014/200457
§ 371 (c)(1),
(2) Date: Mar. 22, 2016

(87) PCT Pub. No.: WO2015/039662
PCT Pub. Date: Mar. 26, 2015

(65) Prior Publication Data
US 2016/0242511 A1  Aug. 25, 2016

(30) Foreign Application Priority Data

Sep. 23, 2013 (DE) .................. 10 2013 219 035

(51) Int. Cl.
*A44B 11/25* (2006.01)
*B60R 22/00* (2006.01)

(52) U.S. Cl.
CPC ...... *A44B 11/2546* (2013.01); *A44B 11/2561* (2013.01); *B60R 22/00* (2013.01)

(58) Field of Classification Search
CPC .. A44B 11/2546; A44B 11/2561; B60R 22/00
See application file for complete search history.

(56) References Cited

U.S. PATENT DOCUMENTS 5,038,446 A   8/1991 Anthony et al.
6,000,110 A   12/1999 Wier
(Continued)

FOREIGN PATENT DOCUMENTS

CN   1151268 A    6/1997
CN   102450785 A  5/2012
(Continued)

OTHER PUBLICATIONS

US 5,758,393, 06/1998, Wier (withdrawn)
(Continued)

*Primary Examiner* — Robert J Sandy
(74) *Attorney, Agent, or Firm* — Gordon Rees Scully Mansukhani, LLP (57) ABSTRACT

A belt buckle for a plug-in tongue of a vehicle seat belt. The buckle includes a holding mechanism for holding an inserted plug-in tongue and with a belt buckle housing which includes a first shell part and a second shell part locked onto the first shell part. The buckle includes a rod-shaped latch element that is mounted on the first shell part. The latch element is pushed along its longitudinal direction into a latch receiver of the second shell part and is held there by means of at least one pair of latching fins. The latching fins on opposite sides of the latch element each bear at an angle on a latch edge, formed on the surface of the latch element, and prevent a withdrawal of the latch element from the latch receiver counter to the insertion direction.

14 Claims, 7 Drawing Sheets

(56) References Cited

U.S. PATENT DOCUMENTS

| | | |
|---|---|---|
| 2009/0324360 A1 | 12/2009 | Schuech et al. |
| 2014/0109349 A1 | 4/2014 | Blank et al. |
| 2016/0007690 A1* | 1/2016 | Haas .................. A44B 11/2515 24/682.1 |

FOREIGN PATENT DOCUMENTS

| | | | |
|---|---|---|---|
| CN | 102883633 A | 1/2013 | |
| CN | 105142454 A | 12/2015 | |
| DE | 20 2008 005 748 U1 | 8/2008 | |
| DE | 10 2008 030 048 A1 | 12/2009 | |
| DE | 20 2010 011 474 U1 | 11/2010 | |
| DE | 102014101743 A1 * | 8/2015 | ......... A44B 11/2546 |
| JP | 2013-043480 A | 3/2013 | |
| WO | WO 2011/147529 A1 | 12/2011 | |
| WO | WO 2013/104388 A1 | 7/2013 | |
| WO | WO 2015/039662 A1 | 3/2015 | |

OTHER PUBLICATIONS

International Search Report dated Nov. 2, 2015 issued in PCT/DE2014/200457.

First Office Action and Search Report dated May 22, 2017 issued in corresponding Chinese Application No. 201480052072.9; filed Sep. 9, 2014.

* cited by examiner

BELT BUCKLE WITH BELT BUCKLE HOUSING

The invention relates to a belt buckle for a plug-in tongue of a vehicle seat belt, with a holding mechanism for holding an inserted plug-in tongue and with a belt buckle housing which comprises a first shell part and a second shell part locked onto the first shell part.

A belt buckle of this kind is known from the international patent application WO 2013/104388 A1. In the previously known belt buckle housing, a connection between the shell parts is effected by means of a rod-shaped latch element, which is pressed into a smooth-walled recess shaped as a blind hole.

The object of the invention is to make available a belt buckle with a belt buckle housing in which, with minimal use of material, a secure connection is achieved between the shell parts, and the connection produced between the shell parts can be released only with especially great force being applied and/or only in a destructive manner.

According to the invention, this object is achieved by a belt buckle having the features of claim 1.

Advantageous embodiments of the belt buckle according to the invention are set forth in the dependent claims.

Thus, according to the invention, a rod-shaped latch element is mounted on the first shell part, which latch element is pushed along its longitudinal direction into a latch receiver of the second shell part and is held there by means of at least one pair of latching fins, wherein the two latching fins of the pair of latching fins on opposite sides of the latch element each bear at an angle on a latch edge, formed on the surface of the latch element, and prevent a withdrawal of the latch element from the latch receiver counter to the insertion direction.

An important advantage of the belt buckle according to the invention is that the angled latching fins of the pair of latching fins permit a secure form-fit connection of the two shell parts not only in the longitudinal direction of the latch element but also perpendicularly with respect to this longitudinal direction. For example, with a suitable orientation of the pair of latching fins, it can be ensured that the rod-shaped latch element holds the two shell parts, specifically in a resilient manner, also along the direction of insertion of the plug-in tongue into the belt buckle housing.

The arrangement of the latching fins of the at least one pair of latching fins on the opposite sides of the latch element can be offset (i.e. at a different height in the latch receiver) or not offset (i.e. at the same height in the latch receiver); however, with a view to an optimal holding force of the latching fins of the pair of latching fins, it is considered advantageous if the two latch edges lie directly opposite each other and the two latching fins are arranged at the same height in the latch receiver and, on mutually opposite sides of the latch element, each bear or engage at an angle on an associated latch edge of the latch element at the same height in the latch receiver.

Preferably, the latch element is integrally formed on the shell base of the first shell part and is supported thereon.

To ensure that the latch connection by means of the latch element has particularly little play or is even entirely free of rattle, it is considered advantageous if the first shell part, in particular the shell base of the first shell part, is elastically deformable and, with the shell parts attached to each other at the shell edges, the length of the latch element is too small to lock the latch element to the two latching fins, and the locking requires an elastic deformation of the first shell part, which deformation subsequently generates a tensile stress on the latch element from the latch receiver and thus generates a tensile stress that holds the two shell parts free of rattle or at least with little play.

In order to ensure, as already mentioned, that the latch connection by the latch element is also rattle-free along the direction of insertion of the plug-in tongue into the belt buckle housing, it is considered advantageous if the two latch edges and the associated two latching fins lie one behind the other as seen along the insertion direction of the plug-in tongue.

With a view to a particularly strong holding force, it is considered advantageous if two pairs of latching fins are mounted on the second shell part, each of them with two mutually opposite latching fins arranged at an angle at the same height in the latch receiver, wherein the two pairs of latching fins are spaced apart from each other as seen along the insertion direction of the latch element and thus lie at different heights in the latch receiver of the shell part.

Regarding the configuration of the latching fins, it is particularly advantageous if the latching fins are formed by latch plates that are trapezoidal seen in cross section, each of them with two parallel plate surfaces and two angled plate surfaces, wherein the latching fins are integrally formed with the first angled plate surface on the second shell part and bear on the latch element via the second angled plate surface.

Preferably, the latching fins are oriented at an angle to the latch element such that in each case the second angled plate surface of the latching fins and the associated latch edge of the latch element lie parallel to the shell base of the second shell part.

With a view to simple assembly of the shell parts, it is considered advantageous if the first shell part and second shell part are moreover connected to each other by a plug connection, which is arranged at a distance from the latch element along the insertion direction of the plug-in tongue and permits a pivoting movement of the first shell part about the second shell part and an insertion of the latch element into the latch receiver by pivoting about the plug connection.

Preferably, the plug connection is formed by a plug element, formed integrally on one of the two shell parts, and by a plug element receiver in the other of the two shell parts.

Regarding the orientation of the above-described components, it is considered advantageous if the insertion direction of the plug-in tongue and/or the longitudinal direction of the plug element extends perpendicularly with respect to the longitudinal direction of the latch element and perpendicularly with respect to the latch edges of the latch element.

The angle between the latching fins and the latch element is preferably in an angle range of between 20° and 70° and is preferably 45°.

The invention further relates to a belt buckle housing for a belt buckle with a first shell part and a second shell part locked onto the first shell part.

Regarding such a belt buckle housing, provision is made, according to the invention, that a rod-shaped latch element is mounted on the first shell part, which latch element is pushed along the longitudinal direction of the latch element into a latch receiver of the second shell part and is held there by means of at least one pair of latching fins, wherein the two latching fins of the pair of latching fins on opposite sides of the latch element each bear at an angle on a latch edge, formed on the surface of the latch element, and prevent a withdrawal of the latch element from the latch receiver counter to the insertion direction, in particular by means of a form-fit connection.

Regarding the advantages of the belt buckle housing according to the invention, reference is made to the above comments concerning the belt buckle according to the invention, since the advantages of the belt buckle according to the invention correspond substantially to those of the belt buckle housing according to the invention.

The invention further relates to a method for connecting a first shell part and a second shell part of a belt buckle housing of a belt buckle for a plug-in tongue of a vehicle safety belt.

Regarding such a method, provision is made, according to the invention, that a rod-shaped latch element mounted on the first shell part is pushed along the longitudinal direction of the latch element into a latch receiver of the second shell part and is locked there by means of at least one pair of latching fins, wherein the two latching fins of the pair of latching fins on opposite sides of the latch element each lock on a latch edge, formed on the surface of the latch element, and prevent a withdrawal of the latch element from the latch receiver counter to the insertion direction.

Regarding the advantages of the method according to the invention, reference is made to the above explanations concerning the belt buckle according to the invention.

Regarding the method, it is particularly advantageous if the first shell part and second shell part are placed with their shell edges on each other and the first shell part, in particular the shell base of the first shell part, is elastically deformed in the direction of the second shell part, as a result of which the latch element which is supported on the shell base of the first shell part, and of which the length is too short to lock the latch element onto the latching fins of the second shell part without deformation, is locked onto the latching fins, and as a result of which a tensile stress is generated on the latch element out of the latch receiver and, therefore, a tensile stress is generated that holds the two shell parts free of rattle.

The invention is explained in more detail below on the basis of illustrative embodiments in the drawings, in which.

In the figures, for the sake of clarity, the same reference signs are always used for identical or comparable components.

Figure 1:
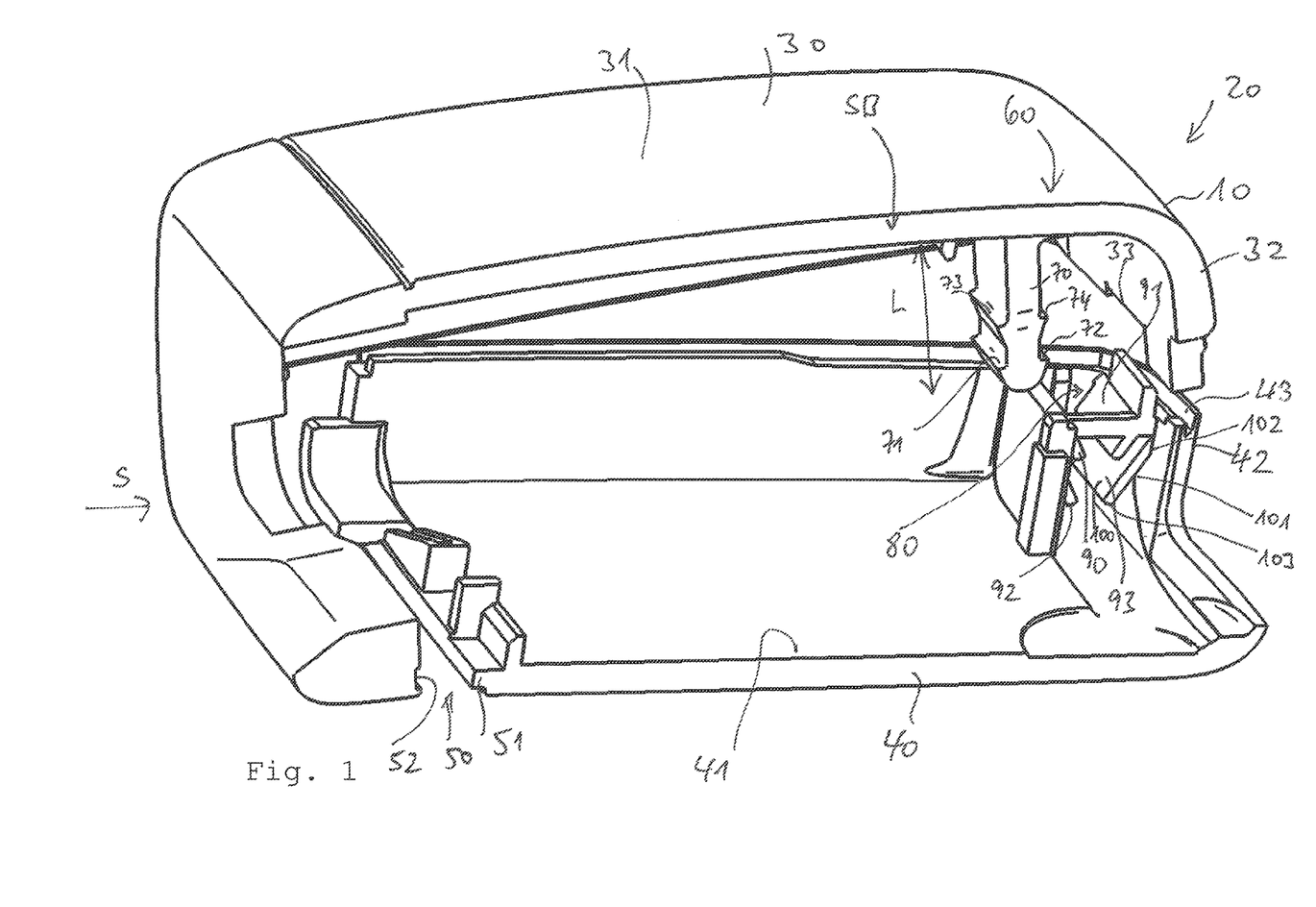
FIGS. 1-6 show a first illustrative embodiment of a belt buckle housing according to the invention which can be used in a belt buckle according to the invention, said figures depicting different views of the belt buckle housing before assembly, during assembly and after assembly.

FIG. 1 shows a belt buckle housing 10 for a belt buckle 20 which is equipped with, among other things, a holding mechanism (not shown) for holding a plug-in tongue of a vehicle seat belt. The holding mechanism is arranged in the interior of the belt buckle housing 10.

FIG. 1 shows the belt buckle housing 10 before its assembly. It will be seen that a first shell part 30 of the belt buckle housing 10 is still separate from a second shell part 40 of the belt buckle housing 10.

In the illustrative embodiment according to FIG. 1, the connection of the two shell parts 30 and 40 is effected by means of a plug connection 50 and a latch connection 60.

In the illustrative embodiment according to FIG. 1, the plug connection 50 is formed by a plug element 51 which extends parallel to the insertion direction S along which the plug-in tongue of the seat belt is inserted into the belt buckle housing 10, in order to lock the plug-in tongue to the holding mechanism (not shown). The plug element 51 is formed integrally on the second shell part 40 and, in order to produce the plug connection 50, is inserted into a plug element receiver 52, which is formed on the first shell part 30. The plug connection 50 permits a pivoting movement of the first shell part 30 along the arrow direction SB toward the second shell part 40, in order to produce the latch connection 60.

The latch connection 60 comprises a rod-shaped latch element 70 which is integrally formed on a shell base 31 of the first shell part 30 and extends at an angle, in particular perpendicularly, from the shell base 31 in the direction toward the second shell part 40. The latch element 70 thus extends parallel, or at least substantially parallel, to a side wall 32, which extends from the first shell base 31 in the direction of the second shell part 40.

The rod-shaped latch element 70 is equipped with two lower latch edges 71 and 72 and two upper latch edges 73 and 74, which are formed by cuttings made perpendicular to the longitudinal direction of the latch element 70 and serve to lock the latch element 70 in a latch receiver 80. The latch receiver 80 is formed in the second shell part 40 and extends perpendicularly, or at least substantially perpendicularly, from the shell base 41 of the second shell part 40 in the direction of the first shell part 30 or in the direction of the latch element 70.

As is shown by way of example in FIG. 1, the latch receiver 80 can be delimited by a side wall 42 of the second shell part 40; the side wall 42 extends perpendicularly, or at least substantially perpendicularly, from the shell base 41 of the second shell part 40 in the direction of the first shell part 30.

The latch receiver 80 is equipped with an upper pair of latching fins, formed by two latching fins 90 and 91, and a lower pair of latching fins, formed by two lower latching fins 92 and 93. The two latching fins 90 and 91 of the upper pair of latching fins lie opposite each other at the same height in the latch receiver 80 and are arranged one behind the other as seen along the insertion direction S. The same applies to the two lower latching fins 92 and 93, which likewise lie opposite each other at the same height inside the latch receiver 80 and are arranged one behind the other along the insertion direction S of the plug-in tongue. The arrangement of the latching fins one behind the other in insertion direction S has the effect that the first shell part 30 cannot be moved relative to the second shell part 40 counter to the insertion direction S and the plug connection 50 between the two shell parts 30 and 40 cannot be released. On account of the spring action of the latching fins, it is additionally ensured here that the plug connection 50, just like the latch connection 60, is also free of rattle.

Figure 3:
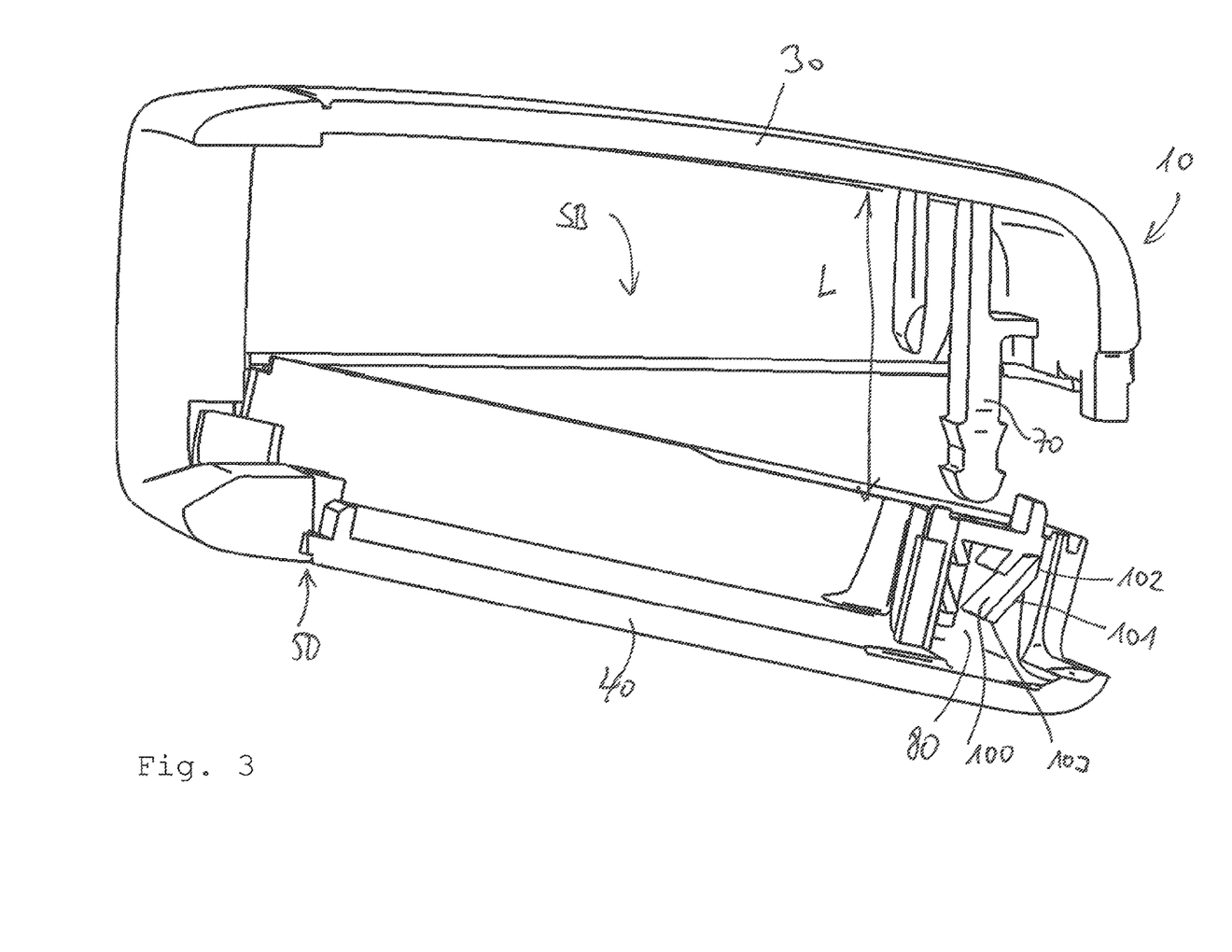

The four latching fins 90, 91, 92 and 93 are each formed by latch plates which have two parallel plate surfaces 100 and 101 and two angled plate surfaces, namely a first angled plate surface 102 and a second plate surface 103 (cf. FIGS. 1 and 3). Viewed in cross section, the latch plates and the latching fins are trapezoidal. With the first angled plate surface 102, the latching fins are each integrally formed on the second shell part 40. The angled plate surface 103 in each case cooperates with the latch element 70 as soon as the latter has been inserted into the latch receiver 80. With the latch connection 60 produced, each second angled plate surface 103 of each latching fin 90, 91, 92 and 93 bears on the respectively assigned latch edge 71, 72, 73 and 74 of the latch element 70.

Figure 2:
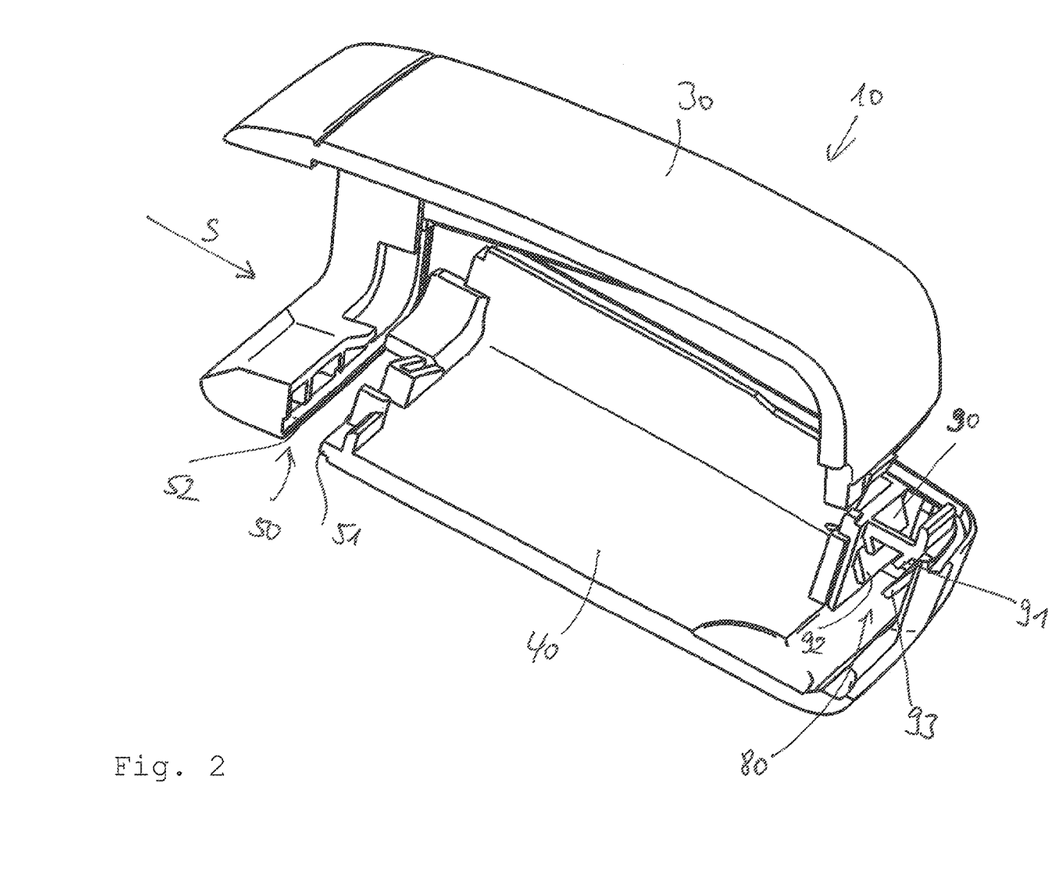

FIG. 2 shows the belt buckle housing 10 according to FIG. 1 in another three-dimensional exploded view, prior to the assembly of the two shell parts 30 and 40 of the belt buckle housing 10. It will be seen that, by moving the two shell parts 30 and 40 relative to each other along the insertion direction S, the plug connection 50 in the area of the plug element 51 and of the plug element receiver 52 can be formed.

FIG. 3 shows the belt buckle housing 10 according to FIGS. 1 and 2 after the plug connection 50 has been produced, and a pivoting of the first shell part 30 along the arrow direction SB in the direction of the second shell part 40 can take place. In the view according to FIG. 3, the rod-shaped latch element 70 has not yet been inserted into its latch receiver 80.

Figure 4:
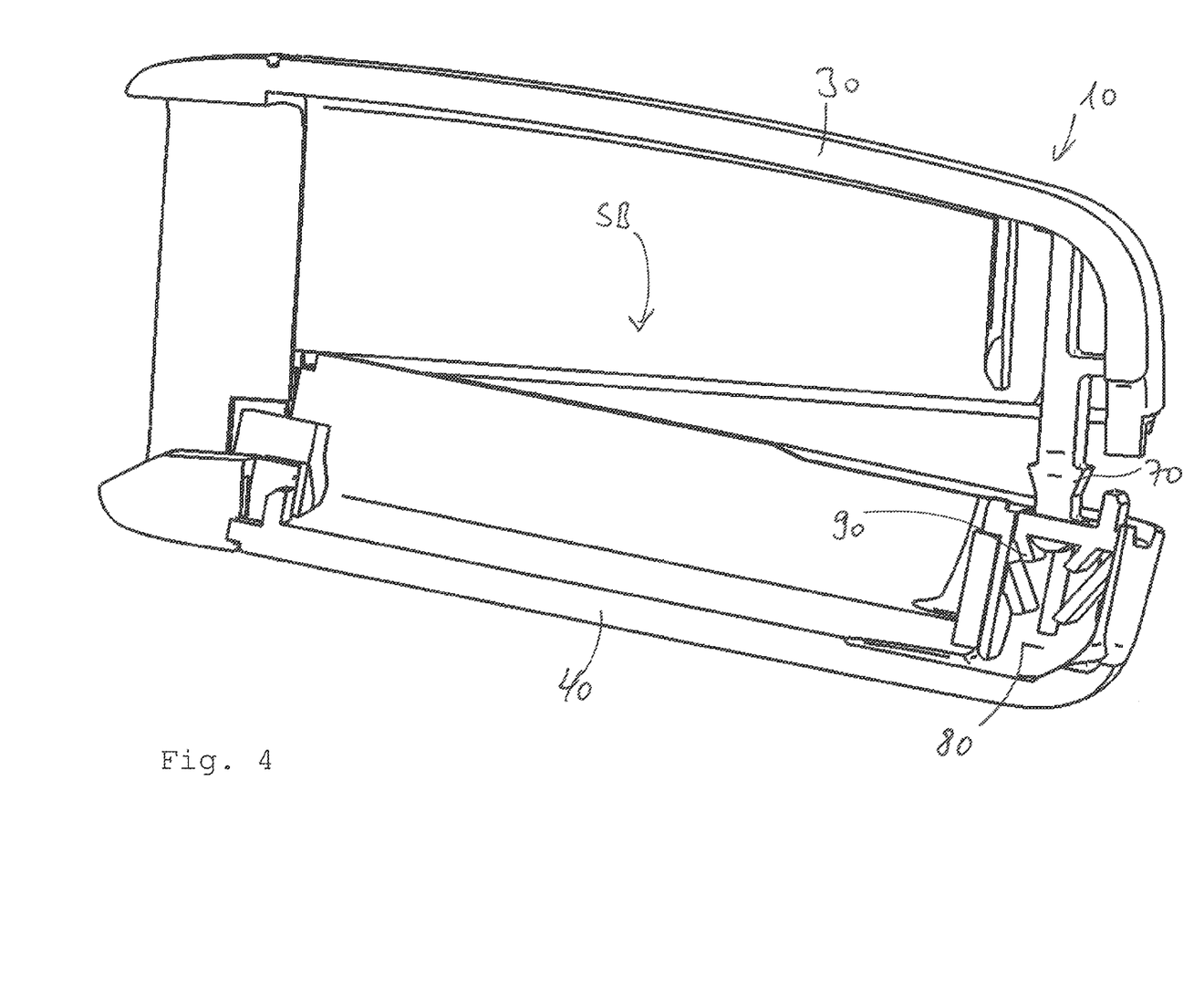

FIG. 4 shows the belt buckle housing 10 according to FIGS. 1 and 3 after the latch element 70 has been partially inserted into the latch receiver 80 by a pivoting movement of the first shell part 30 along the arrow direction SB. It will be seen that the tip of the latch element 70 has made contact with the latching fin 90 of the upper pair of latching fins and bends said latching fin 90 away at least slightly.

Figure 5:
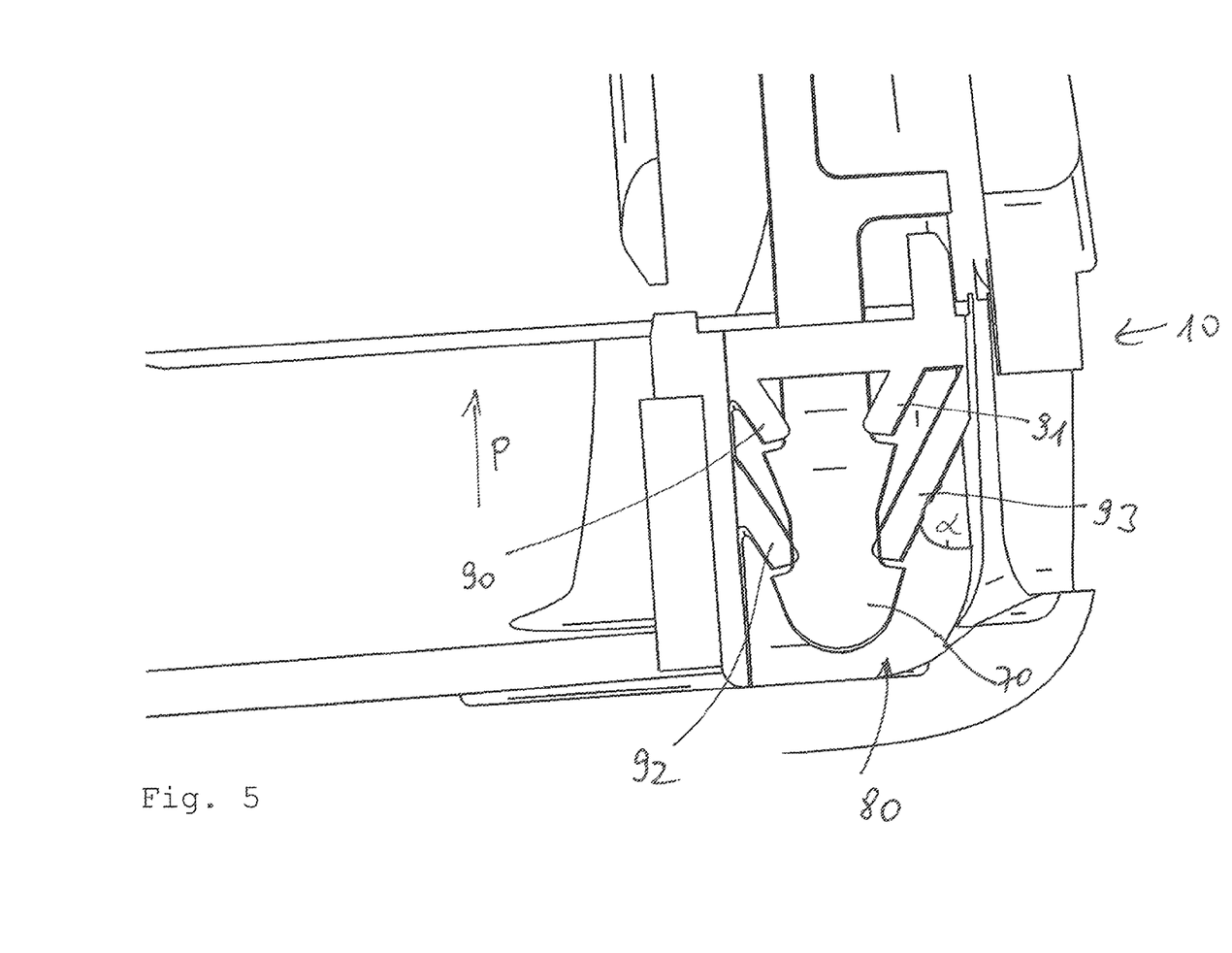

FIG. 5 shows the belt buckle housing 10 after the latch element 70 has been inserted completely into the latch receiver 80 and, by elastic deformation of the shell base 31 (cf. FIG. 1), has been pushed in deeper into the latch receiver 80 than is actually permitted by the length L (cf. FIGS. 1 and 3) of the latch element 70. The elastic deformation of the shell base 31 means that, after the external pressure on the shell base 31 has ceased, the latch element 70 is designed to be withdrawn from the latch receiver 80 along the arrow direction P by the shell base 31, but this is prevented by the latching fins 90, 91, 92 and 93. By means of this tensile force on the latch element 70, the latch element 70 is held without rattling in the latch receiver 80.

The angle α between the latching fins and the latch element is preferably in an angle range of between 20° and 70° and is preferably 45°.

Figure 6:
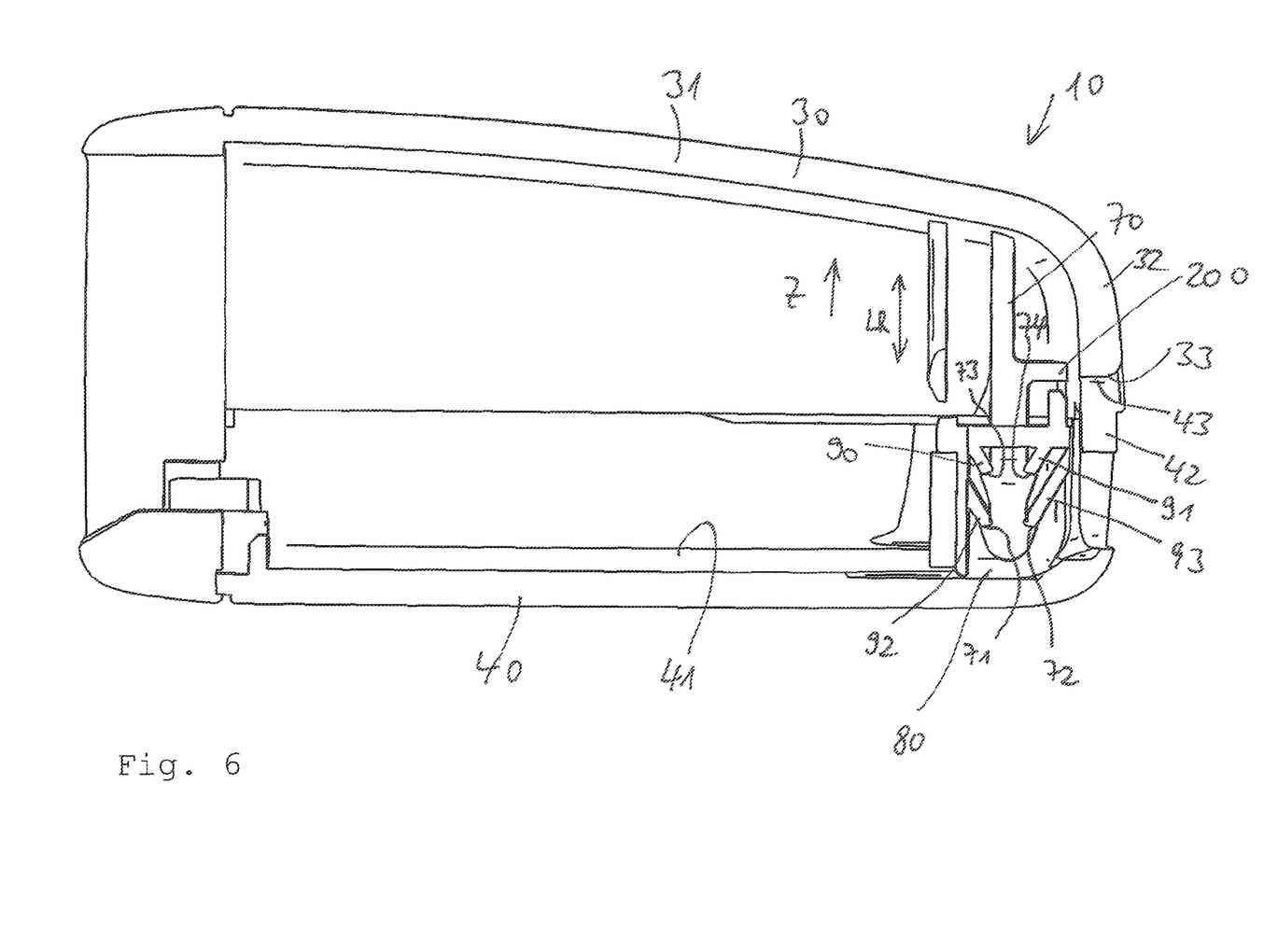

FIG. 6 shows the finally assembled state of the belt buckle housing 10 according to FIGS. 1 to 5. It will be seen that the shell edge 33 of the side wall 32 rests on the shell edge 43 of the side wall 42, such that the two side walls 32 and 42 bear on each other. The shell base 31 generates a tensile force Z, which is intended to withdraw the latch element 70 from the latch receiver 80. However, such withdrawal from the latch receiver 80 is prevented by the four latching fins 90, 91, 92, 93, which secure the latch element 70 in the latch receiver 80.

FIG. 6 additionally shows the arrangement of the four latching fins 90, 91, 92 and 93 in more detail. It will be seen that the two angled plate surfaces 103 (cf. FIG. 1) of the latching fins are oriented substantially parallel to the shell base 41 of the second shell part 40 and each bear on an associated latch edge of the latch element 70. The lower latch edges 71 and 72 and the upper latch edges 73 and 74 likewise extend approximately parallel to the shell base 41, such that optimal bearing of the latching fins on the latch edges is effected.

FIG. 6 additionally shows a reinforcing element 200 which extends at an angle, preferably perpendicularly, away from the longitudinal direction LR of the rod-shaped latch element 70 and is connected in one piece to the side wall 32 of the first shell part 30. The function of the reinforcing element 200 is to mechanically relieve the load on the connection point between the latch element 70 and the shell base 31 and to avoid a situation where the latch element 70 breaks off from the shell base 31.

Figure 7:
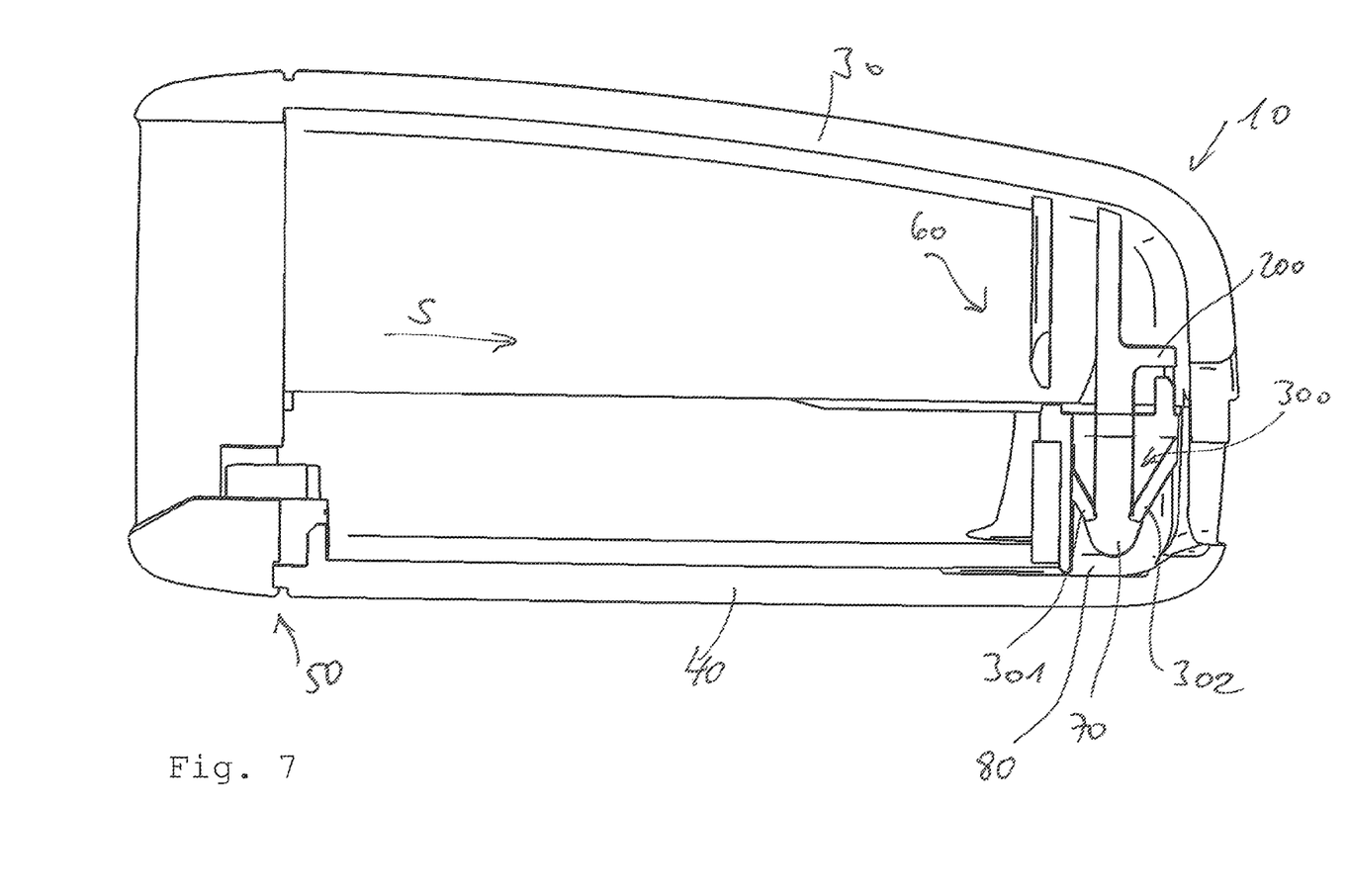
FIG. 7 shows a second illustrative embodiment of a belt buckle housing according to the invention for a belt buckle according to the invention.

FIG. 7 shows a second illustrative embodiment of a belt buckle housing 10 which is composed of a first shell part 30 and of a second shell part 40. In contrast to the illustrative embodiment according to FIGS. 1 to 6, the illustrative embodiment according to FIG. 7 has only a single pair 300 of latching fins, consisting of two latching fins 301 and 302. The two latching fins 301 and 302 serve to lock the latch element 70 and thus to produce the latch connection 60 between the first shell part 30 and the second shell part 40, as has already been explained in connection with FIGS. 1 to 6.

Moreover, in the illustrative embodiment according to FIG. 7, the arrangement of the two latching fins 301 and 302 is chosen such that they are arranged one behind the other relative to the insertion direction S of the plug-in tongue into the interior of the belt buckle housing 10. Such an arrangement of the latching fins advantageously ensures that the first shell part 30 cannot be moved relative to the second shell part 40 counter to the insertion direction S and the plug connection 50 between the two shell parts 30 and 40 cannot be released. On account of the spring action of the latching fins 301 and 302, it is also ensured here that the plug connection 50, just like the latch connection 60, is free of rattle.

LIST OF REFERENCE SIGNS 10 belt buckle housing
20 belt buckle
30 shell part
31 shell base
32 side wall
33 shell edge
40 shell part
41 shell base
42 side wall
43 shell edge
50 plug connection
51 plug element
52 plug element receiver
60 latch connection
70 latch element
71 latch edge
72 latch edge
73 latch edge
74 latch edge
80 latch receiver
90 latching fin
91 latching fin
92 latching fin
93 latching fin
100 plate surface
101 plate surface
102 plate surface
103 plate surface
200 reinforcing element
300 pair of latching fins
301 latching fin
302 latching fin
L length
LR longitudinal direction
P arrow direction
S insertion direction
SB arrow direction
Z tensile force
α angle

The invention claimed is:
1. A belt buckle (20) for a plug-in tongue of a vehicle seat belt, the belt buckle comprising:

a holding mechanism for holding an inserted plug-in tongue; and a belt buckle housing (10) that includes a first shell part (30) and a second shell part (40) locked onto the first shell part, wherein a rod-shaped latch element (70) is mounted on the first shell part, the latch element (70) being pushed along its longitudinal direction into a latch receiver (80) of the second shell part (40), the latch element (70) being held there by at least two latching fins located on opposite sides of the latch element (70);

the at least two latching fins (90, 91, 92, 93) each bear at an angle on an associated latch edge (71, 72, 73, 74) of at least two latch edges formed on the surface of the latch element (70) to prevent a withdrawal of the latch element (70) from the latch receiver (80) counter to an insertion direction (S) of the plug-in tongue.

2. The belt buckle (20) as claimed in claim 1, wherein the at least two latch edges (71, 72, 72, 74) are located directly opposite each other, and the at least two latching fins (90, 91, 92, 93) are arranged at the same height in the latch receiver (80) and bear at an angle on an associated latch edge (71, 72, 73, 74) of the at least two latch edges of the latch element (70) at the same height as the at least two latching fins in the latch receiver (80).

3. The belt buckle (20) as claimed in claim 1, wherein the latch element (70) is integrally formed on a shell base (31) of the first shell part (30).

4. The belt buckle (20) as claimed in claim 3, wherein the shell base (31)

of the first shell part (30) elastically deforms to create a tensile stress on the latch element (70) that holds the first shell part (30) and the second shell part (40) together in a manner free of rattle.

5. The belt buckle (20) as claimed in claim 1, wherein the at least two latch edges (71, 72, 72, 74) and the at least two latching fins (90, 91, 92, 93) associated with the at least two latch edges, respectively, lie one behind the other as seen along the insertion direction (S) of the plug-in tongue.

6. The belt buckle (20) as claimed in claim 1, wherein at least four latching fins are mounted on the second shell part (40) as two pairs of latching fins, each pair of the two pairs of latching fins including two mutually opposite latching fins (90, 91, 92, 93) arranged at an angle at the same height in the latch receiver (80); and the two pairs of latching fins are spaced apart from each other as seen along an insertion direction of the latch element (70) and thus lie at different heights in the latch receiver (80) of the shell part (40).

7. The belt buckle (20) as claimed in claim 1, wherein the at least two latching fins (90, 91, 92, 93) are formed by latch plates that are trapezoidal seen in cross section, each of the latch plates including two parallel plate surfaces (100, 101) and two angled plate surfaces (102, 103); and the at least two latching fins (90, 91, 92, 93) are integrally formed with a first angled plate surface (102) on the second shell part (40) and bear on the latch element (70) via a second angled plate surface (103).

8. The belt buckle (20) as claimed in claim 7, wherein in the at least two latching fins (90, 91, 92, 93) are oriented at an angle to the latch element (70) in such a way that the second angled plate surface (103) of each of the at least two latching fins (90, 91, 92, 93) and the associated latch edge (71, 72, 73, 74) of the latch element (70) lie parallel to a shell base (41) of the second shell part (40).

9. The belt buckle (20) as claimed in claim 1, wherein the first shell part (30) and the second shell part (40) are connected to each other by a plug connection (50), the plug connection (50) being arranged at a distance from the latch element (70) along the insertion direction (S) of the plug-in tongue and permitting a pivoting movement of the first shell part (30) about the second shell part (40) and an insertion of the latch element (70) into the latch receiver (80) by pivoting about the plug connection.

10. The belt buckle (20) as claimed in claim 9, wherein the plug connection (50) is formed by a plug element (51); and the plug element (51) is formed integrally on either the first shell part (30) or the second shell part (40), and is received by a plug element receiver (52) formed in another of the first shell part (30) and the second shell part (40).

11. The belt buckle (20) as claimed in claim 1, wherein the insertion direction (S) of the plug-in tongue extends perpendicularly with respect to the longitudinal direction of the latch element (70) and perpendicularly with respect to the at least two latch edges (71, 72, 73, 74) of the latch element (70).

12. A belt buckle housing (10) for a belt buckle (20), the belt buckle housing (10) comprising:

a first shell part (30); and a second shell part (40) locked onto the first shell part (30), wherein a rod-shaped latch element (70) is mounted on the first shell part (30), the latch element (70) being pushed along a longitudinal direction of the latch element (70) into a latch receiver (80) of the second shell part (40) and being held there by at least two latching fins located on opposite sides of the latch element (70); and the at least two latching fins (90, 91, 92, 93) each bear at an angle on an associated latch edge (71, 72, 73, 74) of at least two latch edges formed on the surface of the latch element (70) to prevent a withdrawal of the latch element (70) from the latch receiver (80) counter to an insertion direction (S) of the plug-in tongue.

13. A method for connecting a first shell part (30) and a second shell part (40) of a belt buckle housing (10) of a belt buckle (20) for a plug-in tongue of a vehicle safety belt, wherein:

a rod-shaped latch element (70) mounted on the first shell part (30) is pushed along a longitudinal direction of the latch element (70) into a latch receiver (80) of the second shell part (40) and is locked there by at least two latching fins located on opposite sides of the latch element (70); and the at least two latching fins (90, 91, 92, 93) each lock on a latch edge (71, 72, 73, 74) formed on the surface of the latch element (70) to prevent a withdrawal of the latch element (70) from the latch receiver (80) counter to an insertion direction (S) of the plug-in tongue.

14. The method as claimed in claim 13, wherein:

the first shell part (30) and the second shell part (40) each have a shell edge (33, 43) that are placed on each other; and a shell base (31) of the first shell part (30) elastically deforms in the direction of the second shell part (40) to generate a tensile stress (Z) on the latch element (70) and lock the latch element (70) onto the at least two latching
fins (90, 91, 92, 93) to hold the first shell part (30) and the second shell part (40) together in a manner free of rattle.

\* \* \* \* \*